(12) United States Patent
LaFleur et al.

(10) Patent No.: US 8,900,669 B2
(45) Date of Patent: Dec. 2, 2014

(54) CLEAR MATTE COATING

(75) Inventors: Edward E. LaFleur, Holland, PA (US); Edwin H. Nungesser, Horsham, PA (US)

(73) Assignee: Rohm and Haas Company, Philadelphia, PA (US)

( * ) Notice: Subject to any disclaimer, the term of this patent is extended or adjusted under 35 U.S.C. 154(b) by 0 days.

(21) Appl. No.: 13/589,206

(22) Filed: Aug. 20, 2012

(65) Prior Publication Data
US 2013/0052357 A1    Feb. 28, 2013

Related U.S. Application Data

(60) Provisional application No. 61/527,150, filed on Aug. 25, 2011.

(51) Int. Cl.
| | | |
|---|---|---|
| *B05D 3/02* | (2006.01) | |
| *C09D 5/02* | (2006.01) | |
| *C09D 7/12* | (2006.01) | |
| *C09D 7/00* | (2006.01) | |
| *C08K 5/54* | (2006.01) | |

(52) U.S. Cl.
CPC .............. *C09D 7/1233* (2013.01); *C09D 5/022* (2013.01); *C08K 5/5406* (2013.01); *C09D 7/005* (2013.01)
USPC .......................................... 427/387; 524/188

(58) Field of Classification Search
CPC ......... B08D 5/02; C09D 133/12; C08K 5/544
USPC .......................................... 427/387; 524/188
See application file for complete search history.

(56) References Cited

U.S. PATENT DOCUMENTS

| | | | |
|---|---|---|---|
| 4,305,863 A | 12/1981 | Adachi et al. | |
| 4,384,056 A | 5/1983 | Schmidt et al. | |
| 4,403,003 A | 9/1983 | Backhouse | |
| 4,518,730 A | 5/1985 | Gastaldo | |
| 4,539,361 A | 9/1985 | Siol et al. | |
| 5,204,233 A | 4/1993 | Ogasawara et al. | |
| 5,237,004 A | 8/1993 | Wu et al. | |
| 7,056,449 B2 | 6/2006 | Hoefler | |
| 7,265,166 B2 * | 9/2007 | Gebhard et al. | .............. 523/205 |
| 7,768,602 B2 | 8/2010 | LaFleur et al. | |
| 7,829,626 B2 | 11/2010 | Chiou et al. | |
| 7,989,082 B2 | 8/2011 | Vanrheenen | |
| 2004/0220306 A1 | 11/2004 | Kageishi et al. | |
| 2008/0017071 A1 | 1/2008 | Moebus et al. | |
| 2011/0159309 A1 | 6/2011 | Jiang et al. | |
| 2012/0164467 A1 | 6/2012 | Sobczak | |

FOREIGN PATENT DOCUMENTS

| | | |
|---|---|---|
| EP | 0041125 A1 | 12/1981 |
| WO | 2009/077412 A2 | 6/2009 |

OTHER PUBLICATIONS

"OPTI-MATT™ UD-4 Duller," Product Notes, The Dow Chemical Company, Aug. 2009.
European Search Report issued in EP 12 17 7772 dated Mar. 19, 2013.
Ma Jianzhong, et al; Leather Chemicals; Chemical Industry Press; pp. 131 142-143.
Chinese Search Report issued in Application #201210306548.X dated Jul. 7, 2014, pp. 1-5.

* cited by examiner

*Primary Examiner* — Robert S Walters, Jr.
(74) *Attorney, Agent, or Firm* — Karl E. Strauss; Ronald D. Bakule

(57) ABSTRACT

A clear polymeric matte coating including from 10% to 65% by weight, based on the weight of the coating, of a first polymer having a calculated Tg of from −60° C. to 100° C.; from 10% to 80% by weight, based on the weight of the coating, of a second particulate polymer having an average particle diameter of from 0.5 microns to 30 microns; and from 0.1% to 15% by weight, based on the weight of the coating, of an aminosilane is provided. Also provided is an aqueous polymeric coating composition form which the clear matte coating may be formed and a method for improving the matting efficiency of an emulsion polymer having a calculated Tg of from −60° C. to 150° C. and an average particle diameter of from 0.5 microns to 30 microns in a coating.

3 Claims, No Drawings

CLEAR MATTE COATING

This invention relates to a clear polymeric matte coating. This invention also relates to an aqueous coating composition and a method for providing a clear matte coating on a substrate. More particularly, this invention relates to a clear polymeric coating including: (a) from 10% to 65% by weight, based on the weight of the coating, of a first polymer having a calculated Tg of from −60° C. to 100° C.; (b) from 10% to 80% by weight, based on the weight of said coating, of a second, particulate, polymer having an average particle diameter of from 0.5 microns to 30 microns; and (c) from 0.1% to 15% by weight, based on the weight of said coating, of an aminosilane.

Matting of a coating surface is achieved by the use of large particles formulated into a coating. It is well known that matting efficiency is accomplished by using either particles substantially larger than most particles in a coating or by providing a poly-disperse distribution of large particles in a coating. Most inorganic matting agents have a high aspect ratio and are irregular in shape. This adds to the matting affect. However, in many formulations organic polymeric matting particles are used to achieve an acceptable level of matting in a coated substrate. These organic particles are frequently spherical and not as efficient as irregularly shaped inorganic matting particles for matting. In the application of spherical matting particles, efficiency is based on particle size and particle poly-dispersity. Larger particles and more poly-disperse particle distributions lead to higher matting efficiency. However, large particles and poly-disperse particles can lead to an undesirable macroscopic film roughness. In many cases it is desirable to provide for film surfaces that are very low in gloss and smooth such to provide an appealing soft-feel to the finish.

U.S. Pat. No. 7,829,626 discloses matte coatings for leather including a binder component and certain copolymer duller particles having an average diameter of 1-20 microns.

Higher matting efficiency for organic particles that are smooth in morphology and low in poly-dispersity is still desired to provide low gloss coatings with a soft-touch. It has been found that certain aminosilane compounds are effective in solving this problem.

In a first aspect of the present invention there is provided a clear polymeric coating comprising: (a) from 10% to 65% by weight, based on the weight of said coating, of a first polymer having a calculated Tg of from −60° C. to 100° C.; (b) from 10% to 80% by weight, based on the weight of said coating, of a second, particulate, polymer having an average particle diameter of from 0.5 microns to 30 microns; and (c) from 0.1% to 15% by weight, based on the weight of said coating, of an aminosilane.

In a second aspect of the present invention there is provided an aqueous polymeric coating composition comprising: (a) from 10% to 65% by weight, based on the dry weight of said coating composition, of a first emulsion polymer having a calculated Tg of from −60° C. to 100° C. and an average particle diameter of from 50 nm to 490 nm; (b) from 10% to 80% by weight, based on the dry weight of said coating composition, of a second emulsion polymer having a calculated Tg of from −60° C. to 150° C. and an average particle diameter of from 0.5 microns to 30 microns; and (c) from 0.1% to 10% by weight, based on the weight of said coating composition, of an aminosilane.

In a third aspect of the present invention there is provided a method for improving the matting efficiency of an emulsion polymer having a calculated Tg of from −60° C. to 150° C. and an average particle diameter of from 0.5 microns to 30 microns in a coating comprising: (a) forming an aqueous coating composition comprising (i) from 10% to 65% by weight, based on the dry weight of said coating composition, of a first emulsion polymer having a calculated Tg of from −60° C. to 100° C. and an average particle diameter of from 50 nm to 490 nm; (ii) from 10% to 80% by weight, based on the dry weight of said coating composition, of a second emulsion polymer having a calculated Tg of from −60° C. to 100° C. and an average particle diameter of from 0.5 microns to 30 microns; and (iii) from 0.1% to 10% by weight, based on the weight of said coating composition, of an aminosilane; (b) applying said aqueous coating composition to a substrate; and (c) drying, or allowing to dry, said applied aqueous coating composition.

A "matte coating" herein is defined as a coating having lower gloss than a continuous coating including only the first polymer herein. A "clear coating" herein is defined as a coating that is substantially free from inorganic particles such as are known in the art, for example, as pigments and extenders; in any event the coating includes from 0% to 10% by weight, preferably from 0% to 5%, more preferably from 0% to 1%, more preferably from 0% to 0.5%, and most preferably from 0% to 0.2% by weight, based on the weight of the clear coating, of inorganic particles.

The aqueous polymeric coating composition of the present invention includes from 10% to 65% by weight, based on the dry weight of the coating composition of a first emulsion polymer having a calculated Tg of from −60° C. to 100° C., preferably from −60° C. to 50° C., and an average particle diameter of from 50 nm to 490 nm.

The first emulsion polymer typically includes at least one nonionic copolymerized ethylenically unsaturated monomer such as, for example, a (meth)acrylic ester monomer including methyl(meth)acrylate, ethyl (meth)acrylate, butyl(meth)acrylate, 2-ethylhexyl(meth)acrylate, decyl (meth)acrylate, hydroxyethyl(meth)acrylate, hydroxypropyl(meth)acrylate, ureido-functional (meth)acrylates and acetoacetates, acetamides or cyanoacetates of (meth)acrylic acid; styrene or substituted styrenes; ethylene; vinyl toluene; butadiene; mono-ethylenically unsaturated acetophenone or benzophenone derivatives such as, for example are taught in U.S. Pat. No. 5,162,415; vinyl acetate or other vinyl esters; vinyl monomers such as vinyl chloride, vinylidene chloride, vinylidene fluoride, and N-vinyl pyrollidone; (meth)acrylonitrile; N-alkylol (meth)acrylamide. The use of the term "(meth)" followed by another term such as (meth)acrylate or (meth)acrylamide, as used throughout the disclosure, refers to both acrylates or acrylamides and methacrylates and methacrylamides, respectively. The first polymer may also be a urethane polymer. The first polymer is substantially uncrosslinked, that is, the first polymer includes less than 1 weight %, preferably less than 0.2 weight %, based on the weight of the polymer, and more preferably 0% of a copolymerized multi-ethylenically unsaturated monomer. Multi-ethylenically unsaturated monomers include, for example, allyl(meth)acrylate, diallyl phthalate, 1,4-butylene glycol di(meth)acrylate, 1,2-ethylene glycol di(meth)acrylate, 1,6-hexanediol di(meth)acrylate, and divinyl benzene.

The first polymer has an acid number of from 5 to 100, calculated by determining the number of milliequivalents of acid per gram in the first polymer and multiplying by the molecular weight of potassium hydroxide. Acid monomers include carboxylic acid monomers such as, for example, acrylic acid, methacrylic acid, crotonic acid, itaconic acid, fumaric acid, maleic acid, monomethyl itaconate, monomethyl fumarate, monobutyl fumarate, and maleic anhydride; and sulfur- and phosphorous-containing acid monomers. Preferred acid monomers are carboxylic acid monomers. More preferred monomers are (meth)acrylic acid.

The calculated glass transition temperature ("Tg") of the first polymer is from −60° C. to 150° C. Tgs of the polymers herein are calculated herein by using the Fox equation (T. G. Fox, Bull. Am. Physics Soc., Volume 1, Issue No. 3, page 123 (1956)). that is, for calculating the Tg of a copolymer of monomers M1 and M2, $$1/Tg(\text{calc.}) = w(M1)/Tg(M1) + w(M2)/Tg(M2),$$

wherein
Tg(calc.) is the glass transition temperature calculated for the copolymer
w(M1) is the weight fraction of monomer M1 in the copolymer
w(M2) is the weight fraction of monomer M2 in the copolymer
Tg(M1) is the glass transition temperature of the homopolymer of M1
Tg(M2) is the glass transition temperature of the homopolymer of M2,
all temperatures being in ° K.

The glass transition temperature of homopolymers may be found, for example, in "Polymer Handbook", edited by J. Brandrup and E. H. Immergut, Interscience Publishers.

The polymerization techniques used to prepare such first emulsion-polymers are well known in the art such as, for example, as disclosed in U.S. Pat. Nos. 4,325,856; 4,654,397; and 4,814,373. Conventional surfactants may be used such as, for example, anionic and/or nonionic emulsifiers such as, for example, alkali metal or ammonium alkyl sulfates, alkyl sulfonic acids, fatty acids, and oxyethylated alkyl phenols. The amount of surfactant used is usually 0.1% to 6% by weight, based on the weight of total monomer. Either thermal or redox initiation processes may be used. Conventional free radical initiators may be used such as, for example, hydrogen peroxide, t-butyl hydroperoxide, t-amyl hydroperoxide, ammonium and/or alkali persulfates, typically at a level of 0.01% to 3.0% by weight, based on the weight of total monomer. Redox systems using the same initiators coupled with a suitable reductant such as, for example, sodium sulfoxylate formaldehyde, sodium hydrosulfite, isoascorbic acid, hydroxylamine sulfate and sodium bisulfite may be used at similar levels, optionally in combination with metal ions such as, for example iron and copper, optionally further including complexing agents for the metal. Redox processes are preferred. The monomer mixture for a stage may be added neat or as an emulsion in water. The monomer mixture for a stage may be added in a single addition or more additions or continuously over the reaction period allotted for that stage using a uniform or varying composition; preferred is the addition of the first and/or second polymer monomer emulsion as a single addition. Additional ingredients such as, for example, free radical initiators, oxidants, reducing agents, chain transfer agents, neutralizers, surfactants, and dispersants may be added prior to, during, or subsequent to any of the stages.

A multi-stage emulsion polymerization process usually results in the formation of at least two mutually incompatible polymer compositions, thereby resulting in the formation of at least two phases. The mutual incompatibility of two polymer compositions and the resultant multiphase structure of the polymer particles may be determined in various ways known in the art. The use of scanning electron microscopy using staining techniques to emphasize the difference between the phases, for example, is such a technique. The multistage emulsion polymer herein is referred to as a core/shell polymer. The polymer particles include two or more phases of various geometries such as, for example, core/shell or core/sheath particles, core/shell particles with shell phases incompletely encapsulating the core, and core/shell particles with a multiplicity of cores.

The average particle diameter of the first emulsion polymer particles is from 50 to 490 nanometers. Processes yielding polymodal particle size distributions such as those disclosed in U.S. Pat. Nos. 4,384,056 and 4,539,361, for example, may be employed.

While the first polymer and the second particulate polymeric particles may themselves, independently, include crosslinked structures, the clear polymeric matte coating has a continuous phase that is substantially uncrosslinked. Typically, no crosslinking species external to the first polymer and the second particulate polymer are included in the clear polymeric matte coating.

The aqueous polymeric coating composition of the present invention includes from 10% to 80% by weight, based on the dry weight of the coating composition, of a second emulsion polymer having a calculated Tg of from −60° C. to 150° C. and an average particle diameter of from 0.5 microns to 30 microns. Preferably, the polymeric particles are either: (a) particles having $T_g$ of from 75° C. to 150° C.; or (b) particles having at least 0.5% polymerized residues of crosslinkers; or a combination thereof. When the particles have a $T_g$ of from −60° C. to 75° C., preferably the particles include, as copolymerized units, from 0.5% to 10%, more preferably from 3% to 10%, multiethylenically unsaturated monomer, by weight based on the weight of the second emulsion polymer.

The second emulsion polymer having a particle diameter of from 0.5 microns to 30 microns may be formed by methods known in the art such as, for example emulsion polymerization, seeded growth processes, and suspension polymerization processes. Such polymers are described, for example, in U.S. Pat. Nos. 4,403,003; 7,768,602; and 7,829,626, and also exemplified herein. The polymer may be may be made in a single stage process, a multiple step process such as a core/shell process that may result in a multiphase particle or in a particle in which the phases co-mingle for a gradient of composition throughout the particle, or in a gradient process in which the composition is varied during one or more stages.

The aqueous polymeric coating composition of the present invention also includes from 0.1% to 10% by weight based on the dry weight of said coating, aminosilane. By "aminosilane" herein is meant a non-polymeric organofunctional alkoxysilane molecule bearing at least one primary or secondary amino group such as, for example, (3-aminopropyl)-triethoxysilane [CAS#919-30-2], (3-aminopropyl)-diethoxy-methylsilane, (3-aminopropyl)-dimethyl-ethoxysilane, (3-aminopropyl)-trimethoxysilane [CAS#13822-56-5], and N-beta-(aminoethyl)-gamma-aminopropyltrimethoxysilane. The inclusion of the aminosilane in the aqueous coating composition and the clear polymeric matte coating herein is independent of the fate, if any, of the aminosilane as to adsorption, complexation, reactivity, etc.

Without being bound by a specific theory, it is believed that the clear polymeric matte coating is formed from the aqueous polymeric coating in such a manner that predominantly the first emulsion polymer forms a continuous film while the second emulsion polymer retains its particulate nature. Consequently, the film formation of the first emulsion polymer may benefit from coalescing agents, heat, and the like, but not to a level or extent that would jeopardize the retention of the particulate identity of the second emulsion polymer.

The aqueous coating composition is prepared by techniques which are well known in the coatings art. The first and second emulsion polymers are added under low shear stirring along with other coatings adjuvants as desired. Preferably the aminosilane component is added to the second emulsion polymer before adding the first emulsion polymer. The aqueous coating composition may contain, in addition to the emulsion polymers and aminosilane, film-forming or non-film-forming solution or emulsion polymers, not within the parameters of the first or second emulsion polymer, in an amount of 0% to 30% by weight of the sum of the first and second emulsion polymer, and conventional coatings adjuvants such as, for example, emulsifiers, coalescing agents, antifreezes, curing agents, buffers, neutralizers, thickeners, rheology modifiers, humectants, wetting agents, plasticizers, antifoaming agents, UV absorbers, fluorescent brighteners, light or heat stabilizers, biocides, chelating agents, dispersants, colorants, waxes, water-repellants, pigments, extenders, and anti-oxidants. In certain embodiments a photosensitive compound such as, for example, benzophenone or a substituted acetophenone or benzophenone derivative as is taught in U.S. Pat. No. 5,162,415 may be added. In certain embodiments the aqueous coating composition of the invention has a VOC (volatile organic compound) level of less than 150 g/liter of coating, alternatively of less than 100 g/liter, or further alternatively of from 0 g/liter to 50 g/liter.

The solids content of the aqueous coating composition may be from 10% to 70% by volume. The viscosity of the aqueous coating composition may be from 50 centipoises to 50,000 centipoises, as measured using a Brookfield viscometer; viscosities appropriate for different application methods vary considerably.

The aqueous coating composition is typically applied to a substrate such as, for example, wood, metal, plastics, leather, paper, vinyl, woven or nonwoven textiles, cementitious substrates such as, for example, concrete, stucco, and mortar, previously painted or primed surfaces, and weathered surfaces. The aqueous coating composition may be applied to a substrate using conventional coatings application methods such as, for example, paint brush, paint roller, curtain coater and spraying methods such as, for example, air-atomized spray, air-assisted spray, airless spray, high volume low pressure spray, and air-assisted airless spray.

Drying of the aqueous coating composition may be allowed to proceed under ambient conditions such as, for example, at 5° C. to 35° C. or the coating may be dried at elevated temperatures such as, for example, from 35° C. to 150° C.

ABBREVIATIONS

Ethyl acrylate EA
Butyl acrylate BA
Methyl methacrylate MMA
Acrylic acid AA
Methacrylic acid MAA
Allyl methacrylate ALMA
DI water=deionized water
Measurement of Particle Size Particle diameters of from 0.5 microns to 30 microns herein are those measured using a Disc Centrifuge Photosedimentometer ("DCP") (CPS Instruments, Inc.) that separates modes by centrifugation and sedimentation through a sucrose gradient. The samples were prepared by adding 1-2 drops into 10 cc DI water containing 0.1% sodium lauryl sulfate. 0.1 cc of the sample was injected into the spinning disc filled with 15 cc. sucrose gradient. Samples were analyzed relative to a polystyrene calibration standard. Specific conditions were: sucrose gradient 2-8%; disc speed 10,000 rpm; calibration standard was 895 nm diameter polystyrene.

Sample A. Formation of First Emulsion Polymer

Synthesis of Sample A, an 80 nm 2-stage emulsion polymer with composition: 80(96.5EA/3.5AA)//20MMA: Fox Tg of stage 1 is −19.04° C.; Fox Tg of Stage 2 is 105° C.

TABLE A.1

Mixtures used in the formation of first emulsion polymer, Sample A:

| Mixture | Component | Parts by Weight |
|---|---|---|
| A5 | Water | 238.58 |
|  | 28% aqueous sodium lauryl sulfate | 28.99 |
|  | 30% aqueous secondary alcohol ethoxylate (15.4 HLB) | 108.21 |
|  | EA | 783.18 |
|  | AA | 28.41 |
| B5 | 0.15% ferrous sulfate heptahydrate | 4.08 |
| C5 | Water | 25.49 |
|  | Ammonium persulfate | 0.81 |
| D5 | Water | 25.49 |
|  | Sodium hydrosulfite | 1.43 |
|  | Ammonium hydroxide | 0.41 |
| E5 | Water | 20 |
|  | t-Butyl hydroperoxide | 0.46 |
| F5 | Water | 20 |
|  | Disodium salts of 2-hydroxy-2-sufinatoacetic acid and 2-hydroxy-sufonatoacetic acid, sodium sulfite. | 0.47 |
| G5 | MMA | 202.90 |
| H5 | Water | 9.18 |
|  | t-Butyl hydroperoxide | 0.92 |
| I5 | Water | 38.74 |
|  | Disodium salts of 2-hydroxy-2-sufinatoacetic acid and 2-hydroxy-sufonatoacetic acid, sodium sufite. | 0.9 |
| J5 | Water | 35.69 |
|  | t-Butyl hydroperoxide | 1.53 |
| K5 | Water | 35.69 |
|  | Disodium salts of 2-hydroxy-2-sufinatoacetic acid and 2-hydroxy-sufonatoacetic acid, sodium sufite. | 1.33 |
| L5 | Triethylamine | 17.84 |
|  | Water | 50.98 |

A reactor equipped with a stirrer and condenser was charged with 1035 g DI water. Nitrogen was allowed to bubble through the water for 30 minutes. The reactor was then blanketed with nitrogen and charged with Mixture A. With the reactor mixture temperature below 20° C., Mixtures B, C and D were rapidly and successively added to the reactor. Within 10 minutes, the temperature rose as the polymerization started and peaked around 70° C. Ten minutes after the peak temperature, mixture E followed by mixture F were added. The material in the reactor was allowed to cool to 60° C. and Mixture G was added followed by Mixtures H and I. After 5 minutes, mixtures J and K were separately metered into the reactor over 30 minutes while the batch was cooled. The neutralizer was then added to partially neutralize the polymerized acid and the polymer sample was then filtered through a 100 mesh screen to remove coagulum.

Sample B. Formation of Second Emulsion Polymer

Synthesis of Sample B, an emulsion polymer of 5 microns average diameter particles having the 2 stage composition: 80(96BA/4ALMA)//20(96MMA/4EA); Fox Tg of stage 1 (not including ALMA) is −54.0° C.; Fox Tg of Stage 2 is 97.5° C.

Formation of seed polymer for use in preparing particulate polymer Unless otherwise noted, the terms "charged" or "added" indicate addition of all the mixture at once. The following mixtures were prepared:

TABLE a.1

Reaction mixtures used in Sample a synthesis.

| Mixture | Component | Parts By Weight |
|---|---|---|
| A | Water | 208 |
|  | Sodium Carbonate | 0.38 |
| B | BA | 98 |
|  | Butylene Glycol Diacrylate | 0.25 |
|  | ALMA | 2.0 |
|  | 10% aqueous Sodium Dodecylbenzenesulfonate | 4.0 |
|  | Water | 40 |
| C | Potassium Persulfate | 0.063 |
|  | Water | 35 |

A reactor equipped with stirrer and condenser and blanketed with nitrogen was charged with Mixture A and heated to 82° C. To the reactor contents was added 15% of Mixture B and 25% of Mixture C. The temperature was maintained at 82° C. and the reaction mixture was stirred for 1 hour, after which the remaining Mixture B and Mixture C were metered in to the reactor, with stirring, over a period of 90 minutes. Stirring was continued at 82° C. for 2 hours, after which the reactor contents were cooled to room temperature. The average diameter of the resulting emulsion particles was 0.2 micron, as measured by light scattering using a BI-90 Plus instrument from Brookhaven Instruments Company, 750 Blue Point Road, Holtsville, N.Y. 11742.

TABLE B.2

Mixtures used in formation of Sample B

| Mixture | Component | Parts by Weight |
|---|---|---|
| A2 | Sodium Carbonate | 0.08 |
|  | 50% Methoxy-beta-cyclodextrin | 2.0 |
|  | Water | 153.3 |
| B2 | Seed polymer | 8.41 |
| C2 | BA | 82.0 |
|  | MMA | 17.8 |
|  | MAA | 0.20 |
|  | 9.76% aqueous Sodium Dodecylbenzenesulfonate | 4.18 |
|  | Water | 22.21 |
| D2 | n-Dodecyl Mercaptan | 22.00 |
|  | 9.76% aqueous Sodium Dodecylbenzenesulfonate | 2.04 |
|  | Water | 21.65 |
| E2 | Sodium Persulfate | 0.20 |
|  | Water | 10.0 |
| F2 | t-Butyl Hydroperoxide 70% | 0.30 |
|  | Water | 15.00 |
| G2 | Sodium Formaldehyde Sulfoxylate | 0.20 |
|  | Water | 6.67 |

Mixture A2 was added to the reactor and heated to 88° C. with stirring. The air in the reactor was replaced by nitrogen. When the reactor temperature stabilized at 88° C., Mixture B2 was charged into the reactor. Emulsified Mixtures C2 and D2, and Mixture E2 were then added to the reactor, with stirring, over a period of 240 minutes. Stirring was continued at 88° C. for 90 minutes. The reactor contents were cooled to 65° C. Mixtures F2 and G2 were added and the reactor contents were maintained at 65° C. with stirring for 1 hour, after which the reactor contents were cooled to room temperature. The resulting emulsion particles had a diameter of 0.75 microns as measured by a Brookhaven Instruments particle size analyzer BI-90.

The following mixtures A3-G3 were prepared with DI water:

TABLE 5

| Mixture | Component | Parts by Weight |
|---|---|---|
| Stage I | | |
| A4 | Water | 1400.0 |
| B4 | Aqueous emulsion from last stage | 9.70 |
| C4 | BA | 768.0 |
|  | ALMA | 32.0 |
|  | 23% aqueous Sodium Dodecylbenzenesulfonate | 12.60 |
|  | Water | 324.4 |
| D4 | t-Butyl Peroctoate | 3.82 |
|  | 23% aqueous Sodium Dodecylbenzenesulfonate | 0.16 |
|  | Water | 8.40 |
| Stage II | | |
| E4 | MMA | 191.7 |
|  | EA | 8.30 |
|  | 23% aqueous Sodium Dodecylbenzenesulfonate | 2.43 |
|  | Water | 50.2 |
| F4 | 2% Sodium Formaldehyde Sulfoxylate in water | 40.0 |
| G4 | 4.4% t-Butyl Hydroperoxide (70%) in water | 24.90 |

To a reactor A4 was added and was heated to 76° C. with stirring. The air in the reactor was replaced by nitrogen. When the reactor temperature stabilized at 76° C., Mixture B4 was charged into the reactor. 20% of Mixture C4 was charged into the reactor. The reactor was stirred at 60-65° C. for 0.5 hours. Mixture D4 was charged into the reactor. After 23 minutes agitation at 60-65° C. an exothermic polymerization took place. After reaching peak temperature, agitation was continued while the remaining 80% of mixture C4 was added over 48 minutes. 27.5% of Mixture F4 was charged. Mixtures E4, the remainder of F4, and G4 were then separately added into the reactor over a period of 45 minutes. The temperature was maintained between 75-80° C. and stirring was continued for 1 hour before the reactor was cooled to room temperature. To the resultant polymer 1.5% of ACRYSOL™ ASE-60 is added based on the total weight of the emulsion and the pH was increased by sequential additions of triethylamine to a pH of 7-9.

Sample C. Formation of Second Emulsion Polymer

Synthesis of Sample C, an emulsion polymer of 5 um average diameter particles having the 2 stage composition: 80(91.2 BA/2.4 EHA/2.4 HEMA/4 ALMA)//20(96MMA/4EA); Fox Tg of stage 1 (not including ALMA) is −53° C.; Fox Tg of Stage 2 is 97.5° C. was conducted according to the teachings of the synthesis of Sample B herein.

EXAMPLES 1-3 AND COMPARATIVE EXAMPLE A

Effect of Aminosilane Concentration on Matting Efficiency Improvement

TABLE 1.1

Pre-mixture of aminosilane and second emulsion polymer

|  | Mixture 1-1 | Mixture 1-2 | Mixture 1-3 | Mixture 1-4 |
|---|---|---|---|---|
| % aminosilane | 0 | 1.6% | 3.4% | 7.3% |
| Sample B | 200 | 203.8 | 193.2 | 172 |
| SILQUEST™ A1120 (aminosilane) | — | 3.4 | 6.8 | 13.6 |

TABLE 1.2

Formation of aqueous polymeric coating composition and evaluation of clear polymeric matte coating

| Sample | | Comp. Ex. A | Ex. 1 | Ex. 2 | Ex. 3 |
|---|---|---|---|---|---|
| Mixture 1-1 | 0% aminosilane | 44 | | | |
| Mixture 1-2 | 1.6% aminosilane | | 44 | | |
| Mixture 1-3 | 3.4% aminosilane | | | 44 | |
| Mixture 1-4 | 7.3% aminosilane | | | | 44 |
| Sample A | First emulsion polymer | 94 | 94 | 94 | 94 |
| water | | 30 | 30 | 30 | 30 |
| ACRYSOL ™ ASE-60 | thickener | 3 | 3 | 3 | 3 |
| Aq. Ammonia (26%) | | 1 | 1 | 1 | 1 |
| total | | 177 | 177 | 177 | 177 |
| % aminosilane in paint | | 0 | 0.4% | 0.8% | 1.8% |
| % total solids | | 0.270 | 0.272 | 0.275 | 0.282 |
| Gloss | 60 deg | 3.2 | 2.5 | 2.1 | 1.1 |
| (1.5 mil dd) | 85 deg | 8.8 | 8.5 | 11 | 3.6 |

*Gloss measured on a Leneta 1B chart over black portion of chart.

EXAMPLES 4-5 AND COMPARATIVE EXAMPLES B-C

Formation of Clear Polymeric Matte Coatings

TABLE 4.1

Pre-mixture of aminosilane and second emulsion polymer

| | Composition | Mixture 4-1 | Mixture 4-2 |
|---|---|---|---|
| Sample C | 80(2.4HEMA/2.4EHA/4ALMA//91.2BA)//20(96MMA/4EA) | 200 | |
| Sample B | 80(4ALMA//96BA)//20(96MMA/4EA) | | 200 |
| SILQUEST ™ A1120 | N-beta-(Aminoethyl)-gamma-aminopropyltrimethoxysilane) | 15.8 | 15.8 |
| Solids of mixture | | 38% | 37% |
| % aminosilane in pre-mixture | | 7.3% | 7.3% |

SILQUEST ™ is a trademark of Momentive Performance Materials Inc.

TABLE 4.2

Formation of aqueous polymeric coating composition and evaluation of clear polymeric matte coating

| | Comp. Ex. B | Ex. 4 | Comp. Ex. C | Ex. 5 |
|---|---|---|---|---|
| % amino silane in paint | 0% | 1.7% | 0% | 1.8% |
| Sample C | 121 | | | |
| Mixture 4-1 | | 105.4 | | |
| Mixture 4-2 | | | | 108.58 |
| Sample B | | | 125.6 | |
| Water | 93 | 108.5 | 88.5 | 105.5 |
| Sample A first emulsion polymer | 171.9 | 171.9 | 171.9 | 171.9 |
| water | 28.485 | 28.485 | 28.485 | 28.485 |
| ACRYSOL ™ RM-825 | 20.25 | 20.25 | 20.25 | 20.25 |
| AQUADERM ™ Fluid H | 7.065 | 7.065 | 7.065 | 7.065 |
| 2229W | 8.46 | 8.46 | 8.46 | 8.46 |
| Total weight | 450.16 | 450.06 | 450.26 | 450.24 |
| Initial gloss 3 mil dd* | 5.2/28.1 | 2.1/6.5 | 4.9/19.8 | 3.1/7.8 |
| 16 hr RT after prep 3 mil dd* | 5.5/28.3 | 2.3/6.8 | 4.1/14.8 | 3.0/7.1 |
| DD tack (feel assessment) | = | ++ (improved) | = | ++ (improved) |

*Gloss measured on a Leneta 1B chart over black portion of chart.

ACRYSOL ™ is a trademark of The Dow Chemical Company. AQUADERM ™ is a trademark of Croda, Inc.

Tack and feel assessment of drawdowns (DD). Using a 3 mil bird type applicator side to side drawdowns were prepared of the comparative and the corresponding example on the same Leneta 1B chart and dried in a 120° C. oven for 5 minutes. After completely dried the films were cooled to ambient temperature and the top surface of both coatings were rubbed by hand to assess the degree of tack (or friction) presented by the coating. The subjective results are expressed as compared directly to the control. An equivalent feel and tack is indicted by (=) and an improvement in the feel and tack reduction is indicated by (+).

Aqueous coating compositions of the invention, Examples 4 and 5, provide clear polymeric matte coatings having desirably lower gloss and improved feel relative to the corresponding comparative examples.

EXAMPLE 6 AND COMPARATIVE EXAMPLES D-G

Formation of Clear Polymeric Matte Coatings

TABLE 6.1

Pre-mixture of various silanes and second emulsion polymer, Sample B

| | | Mixtures | | | | |
|---|---|---|---|---|---|---|
| | Silane type | 6-1 | 6-2 | 6-3 | 6-4 | 6-5 |
| Sample B | | 200 | 200 | 200 | 200 | 117 |
| SILQUEST ™ SIT7110.0 | Tetraethoxysilane | | 3.4 | | | |
| SILQUEST ™ O6715.0 | Octyltriethoxysilane | | | 3.4 | | |
| SILQUEST ™ SiG5840.0 | (3-Glycidoxypropyl) trimethoxysilane | | | | 3.7 | |
| SILQUEST ™ A1120 | N-beta-(Aminoethyl)-gamma-aminopropyl-trimethoxysilane | | | | | 2 |
| total | | 200 | 203.4 | 203.4 | 203.7 | 119 |
| % silane in premix | | 0.00 | 1.7 | 1.7 | 1.8 | 1.7 |

TABLE 6.2

Formation of aqueous polymeric coating composition and evaluation of clear polymeric matte coating

| Ingredient | Comp. Ex. D | Comp. Ex. E | Comp. Ex. F | Comp. Ex. G | Ex. 6 |
|---|---|---|---|---|---|
| 6-1 | 44 | | | | |
| 6-2 | | 44 | | | |
| 6-3 | | | 44 | | |
| 6-4 | | | | 44 | |
| 6-5 | | | | | 44 |
| Sample A | 94 | 94 | 94 | 94 | 94 |
| water | 30 | 30 | 30 | 30 | 30 |
| ACRYSOL ™ ASE-60 | 3 | 3 | 3 | 3 | 3 |
| ammonia | 1 | 1 | 1 | 1 | 1 |
| total | 177 | 177 | 177 | 177 | 177 |
| % silane in paint | 0% | 0.4% | 0.4% | 0.4% | 0.4% |
| 1.5 mil DD gloss over penopec 1B (black) 60 deg | 3.7 | 3.9 | 3.7 | 3.9 | 3.0 |
| 85 deg | 10.4 | 10.5 | 10.4 | 10.2 | 10.1 |
| Visual assessment compared to no silane control (gloss, jetness) | Control | = | = | = | ++ |
| Appearance Description | Control | Equal to control | Equal to control | Equal to control | lower gloss, improved color clarity |

Visual assessment of drawdowns (DD). Using a 1.5 mil bird type applicator drawdowns were prepared of the control and the samples on Leneta 1B charts and dried in a 120° C. oven for 5 minutes. After completely dried the films were cooled to ambient temperature and the visual appearance of the coating was assessed over the black portion of the Leneta chart for overall visual gloss reduction and jetness (which is a measure of the blackness of the background observed by the observers eye). An equivalent appearance to the control is indicted by (=) and an improvement in the appearance and jetness is indicated by (+).

The aqueous coating composition of the invention, Example 6, provides clear polymeric matte coatings having desirably lower gloss and improved color clarity, i.e., greater matting efficiency, relative to the corresponding comparative examples that incorporate silanes other than aminosilanes.

What is claimed is:

1. A clear polymeric matte coating comprising:
   (a) from 10% to 65% by weight, based on the weight of said coating, of a first polymer having a calculated Tg of from −60° C. to 100° C.;
   (b) from 10% to 80% by weight, based on the weight of said coating, of a second particulate polymer having an average particle diameter of from 0.5 microns to 30 microns; and
   (c) from 0.1% to 15% by weight, based on the weight of said coating, of an aminosilane.

2. An aqueous polymeric coating composition comprising:
   (a) from 10% to 65% by weight, based on the dry weight of said coating composition, of a first emulsion polymer having a calculated Tg of from −60° C. to 100° C. and an average particle diameter of from 50 nm to 490 nm;
   (b) from 10% to 80% by weight, based on the dry weight of said coating composition, of a second emulsion polymer having a calculated Tg of from −60° C. to 150° C. and an average particle diameter of from 0.5 microns to 30 microns; and
   (c) from 0.1% to 10% by weight, based on the weight of said coating composition, of an aminosilane.

3. A method for improving the matting efficiency of an emulsion polymer having a calculated Tg of from −60° C. to 150° C. and an average particle diameter of from 0.5 microns to 30 microns in a coating comprising:
   (a) forming an aqueous coating composition comprising:
      (i) from 10% to 65% by weight, based on the dry weight of said coating composition, of a first emulsion polymer having a calculated Tg of from −60° C. to 100° C. and an average particle diameter of from 50 nm to 490 nm;
      (ii) from 10% to 80% by weight, based on the dry weight of said coating composition, of a second emulsion polymer having a calculated Tg of from −60° C. to 150° C. and an average particle diameter of from 0.5 microns to 30 microns; and
      (iii) from 0.1% to 10% by weight, based on the weight of said coating composition, of an aminosilane;
   (b) applying said aqueous coating composition to a substrate; and
   (c) drying, or allowing to dry, said applied aqueous coating composition.

* * * * *